United States Patent
Onuoha

(10) Patent No.: US 8,357,453 B2
(45) Date of Patent: Jan. 22, 2013

(54) HUMIDITY-REACTIVE HOTMELT ADHESIVE WITH INCREASED OPEN TIME

(75) Inventor: Ukiwo Onuoha, Bassersdorf (CH)

(73) Assignee: Sika Technology AG, Baar (CH)

( * ) Notice: Subject to any disclaimer, the term of this patent is extended or adjusted under 35 U.S.C. 154(b) by 732 days.

(21) Appl. No.: 12/226,351

(22) PCT Filed: Jun. 29, 2007

(86) PCT No.: PCT/EP2007/056600
§ 371 (c)(1),
(2), (4) Date: Oct. 16, 2008

(87) PCT Pub. No.: WO2008/000832
PCT Pub. Date: Jan. 3, 2008

(65) Prior Publication Data
US 2009/0110937 A1 Apr. 30, 2009

(30) Foreign Application Priority Data
Jun. 30, 2006 (EP) .................................... 06116413

(51) Int. Cl.
*B32B 27/40* (2006.01)
*C08L 75/04* (2006.01)
*C09D 175/04* (2006.01)

(52) U.S. Cl. .............. 428/423.1; 428/424.6; 428/425.1; 428/425.6; 428/425.8; 428/425.9; 526/935; 525/457; 524/500; 156/60

(58) Field of Classification Search ............... 428/424.6, 428/425.1, 425.6, 425.8, 425.9, 423.1; 526/935; 525/452, 457; 524/500; 156/60
See application file for complete search history.

(56) References Cited

U.S. PATENT DOCUMENTS

| 4,672,100 A | 6/1987 | Schönbächler et al. |
| 5,472,785 A * | 12/1995 | Stobbie et al. ............. 428/423.1 |
| 5,747,581 A | 5/1998 | Proebster et al. |

FOREIGN PATENT DOCUMENTS

| CA | 2 164 408 | 3/2005 |
| EP | 0 716 108 A2 | 6/1996 |
| EP | 0 705 290 B1 | 5/1999 |
| JP | A-60-184514 | 9/1985 |
| JP | A-8-511815 | 12/1996 |
| JP | A-10-310624 | 11/1998 |
| JP | A-11-323302 | 11/1999 |
| WO | WO 03/060033 A1 | 7/2003 |

OTHER PUBLICATIONS

Dec. 13, 2011 Office Action issued in Japanese Patent Application No. 2009-515898 (with translation).

* cited by examiner

*Primary Examiner* — Thao T. Tran
(74) *Attorney, Agent, or Firm* — Oliff & Berridge, PLC

(57) ABSTRACT

The invention relates to moisture-reactive hotmelt adhesive compositions which comprise at least one polyurethane prepolymer P1 being liquid at room temperature containing isocyanate groups and also at least one linear polyurethane P2 being solid at room temperature which comprises polycaprolactone segments, contains hydroxyl groups and has a melt viscosity of 100-300 Pa·s at 170° C. The compositions are notable in particular for a prolonged open time.

19 Claims, No Drawings

HUMIDITY-REACTIVE HOTMELT ADHESIVE WITH INCREASED OPEN TIME

FIELD OF THE INVENTION

The invention pertains to the field of moisture-reactive hotmelt adhesives, intended more particularly for the adhesive bonding of glazing units of means of transport and in window or door construction.

DESCRIPTION OF THE PRIOR ART

Reactive polyurethane hotmelt adhesives have been known for a long time. Hotmelt adhesives (hot melts) have the great advantage that on cooling they solidify and so quickly develop strength. Reactive polyurethane adhesives contain isocyanate groups, which crosslink with water, in the form more particularly of atmospheric moisture, as a result of which the adhesives undergo a further increase in strength and their remelting at elevated temperature is prevented.

Hotmelt adhesives, however, have the great disadvantage that, on contact between the cold substrate and the hot adhesive melt, the adhesive is cooled very suddenly. As a result of this very sudden cooling, large stresses occur in the adhesive, more particularly at the adhesive/substrate interface, which is essential for adhesion, and the substrate in contact with the adhesive can no longer be moved a short time after joining, typically after a few seconds or minutes. This capacity to be moved, however, is often absolutely vital for final positioning or fine adjustment in industrial operations, such as in the bonding of glazing units, for example.

For this reason, hotmelt adhesives, more particularly those with an application temperature of above 80° C., are seldom used for applications of this kind.

A diversity of efforts have been made to reduce these disadvantages of hotmelt adhesive. Thus EP-B-0 705 290 describes a hotmelt adhesive featuring a skinover time of 30 minutes that comprises a reactive prepolymer being liquid at room temperature and a polymer or prepolymer being solid at room temperature, that can be liquefied at a temperature of 40 to 50° C. and that following application allows the substrate to be moved for a number of minutes (open time).

It has, however, emerged that this open time is, however, too short for numerous applications. For instance, there are on the one hand applications in which the time for final positioning is longer or in which a longer open time is required. Thus, for example, in the adhesive bonding of substrates of large area, such as externally mounted modules or glazing units of means of transport, more particularly of buses or rail vehicles, it is necessary to have a certain open time of at least 40 minutes. The reason is that, during this time, it is necessary to apply the adhesive and carry out joining and final positioning, without the adhesive having already formed a skin or at any point having already solidified to an extent such that adhesion to the substrate is no longer ensured there.

Customary one-component polyurethane adhesives applied at room temperature do in fact have a relatively long open time. The development of their strength, which is accomplished solely through the crosslinking of isocyanate prepolymers with water, more particularly atmospheric moisture, however, is too slow to prevent the substrate slipping, without fixing aids, or to permit early spatial displacement of the adhesive bond.

SUMMARY OF THE INVENTION

It is an object of the present invention, therefore, to provide a hotmelt adhesive composition which overcomes the disadvantages of the prior art and first possesses an increased open time while yet second possessing a sufficiently high early strength.

A hotmelt adhesive of this kind allows first an extended positioning of the substrate and second a reliable adhesive bonding of substrates of large surface area.

It has surprisingly been found that this is made possible by a moisture-reactive hotmelt adhesive composition according to Claim 1.

DESCRIPTION OF THE PREFERRED EMBODIMENTS

The present invention first provides a moisture-reactive hotmelt adhesive composition which comprises at least one polyurethane prepolymer P1 containing isocyanate groups being liquid at room temperature and also at least one linear polyurethane P2 being solid at room temperature having a melt viscosity of 100-300 Pa·s at 170° C. and which comprises polycaprolactone segments and contains hydroxyl groups.

One feature essential to the invention is the presence of at least one linear polyurethane P2 being solid at room temperature which comprises polycaprolactone segments and contains hydroxyl groups. The solid polyurethane P2 has a melt viscosity, measured in accordance with DIN 53.735, of 100-300 Pa·s, preferably of 100-150 Pa·s, at 170° C.

It has emerged that it is essential for the solid polyurethane P2 to contain hydroxyl groups. If, instead, other solid polyurethanes with terminal isocyanate groups, or those without hydroxyl groups, are used, the behaviour essential to the invention is not obtained and/or disadvantages occur. The solid polyurethane P2 preferably has a hydroxyl number of less than 5 mg KOH/g.

The polyurethane P2 is solid at room temperature and has more particularly a melting point of at least 50° C., typically between 60 and 80° C., preferably between 60 and 70° C. The melting point referred to is more particularly the maximum of the curve determined by means of dynamic differential calorimetry (DSC, differential scanning calorimetry) during the heating operation, at which the material undergoes transition from the solid to the liquid state.

The solid polyurethane P2 is linear and comprises polycaprolactone segments as a structural element. It is prepared more particularly by an addition reaction from at least one polycaprolactone diol and at least one diisocyanate having a molecular weight of below 1000 g/mol; in addition, short-chain diols can be used as chain extenders. The addition reaction is conducted such that the sum of the hydroxyl groups of the polycaprolactone diol and of the chain extender used optionally are present in a stoichiometric excess in relation to the isocyanate groups of the polyisocyanate.

In one particularly preferred embodiment the polyurethane P2 is a polyurethane chain extended by an alkylene diol, more particularly butane diol, and formed from polycaprolactone diol and a diisocyanate having a molecular weight of below 1000 g/mol.

As a diisocyanate having a molecular weight of below 1000 g/mol, suitability is possessed more particularly by 4,4'-, 2,4'- and 2,2'-diphenyl-methane diisocyanate and any desired mixtures of these isomers (MDI), 2,4- and 2,6-tolylene diisocyanate and any desired mixtures of these isomers (TDI), 1,6-hexamethylene diisocyanate (HDI), 1-isocyanato-3,3,5-trimethyl-5-isocyanatomethylcyclohexane (i.e. isophorone diisocyanate or IPDI) and perhydro-2,4'- and -4,4'-diphenylmethane diisocyanate (HMDI). MDI is considered to be preferred.

The solid polyurethane P2 preferably has a melt flow index (MFI), measured in accordance with DIN 53.735, of 30-100 g/10 minutes, more particularly of 70-90 g/10 minutes.

The polyurethane P2 is notable for a very fast crystallization rate and a high degree of thermoplasticity.

Preferred solid polyurethanes P2 are certain ones obtainable under the brand name Pearlbond® from Merquinsa, Spain. Particular preference is given to Pearlbond® DIPP-523, Pearlbond® 503, Pearlbond® DIPP-521 and Pearlbond® 501. Most preferred are Pearlbond® DIPP-523 and Pearlbond® 503.

The fraction of the linear polyurethane P2 being solid at room temperature is preferably 1.5%-10% by weight, more preferably 2.0% to 6.5% by weight, based on the overall hotmelt adhesive composition.

The moisture-reactive hotmelt adhesive composition further comprises a polyurethane prepolymer P1 being liquid at room temperature containing isocyanate groups. Suitable polyurethane prepolymers P1 are obtainable more particularly through the reaction of at least one polyisocyanate with at least one polyol, the NCO/OH ratio being not more than 2.5, more particularly not more than 2.2.

This reaction may take place by reaction of the polyol and the polyisocyanate by customary methods, at temperatures of 50° C. to 100° C., for example where appropriate with accompanying use of suitable catalysts, the polyisocyanate being metered such that its isocyanate groups are present in a stoichiometric excess in relation to the hydroxyl groups of the polyol. With advantage the polyisocyanate is metered so as to observe an NCO/OH ratio of $\leq$2.5, preferably $\leq$2.2. By the NCO/OH ratio here is meant the ratio of the number of isocyanate groups employed to the number of hydroxyl groups employed. Preferably, following the reaction of all of the hydroxyl groups of the polyol, there remains a free isocyanate group content of 0.5% to 3% by weight, based on the overall polyurethane prepolymer P1.

If desired, the polyurethane prepolymer P1 can be prepared with the accompanying use of plasticizers, in which case the plasticizers used contain no isocyanate-reactive groups.

As polyols for preparing a polyurethane prepolymer P1 it is possible, for example, to use the following commercially available polyols or mixtures thereof:

Polyoxyalkylene polyols, also called polyether polyols or oligoetherols, which are polymerization products of ethylene oxide, 1,2-propylene oxide, 1,2- or 2,3-butylene oxide, tetrahydrofuran or mixtures thereof, possibly polymerized by means of a starter molecule having two or more active hydrogen atoms, such as water, ammonia or compounds having two or more OH or NH groups such as 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, and also mixtures of the aforementioned compounds. Use may be made both of polyoxyalkylene polyols which have a low degree of unsaturation (measured as claimed in ASTM D-2849-69 and reported in milliequivalents of unsaturation per gram of polyol (meq/g)), prepared for example with the aid of what are known as double metal cyanide complex catalysts (DMC catalysts), and of polyoxyalkylene polyols having a higher degree of unsaturation, prepared for example by means of anionic catalysts such as NaOH, KOH, CsOH or alkali metal alkoxides.

Particular suitability is possessed by polyoxyalkylene diols or polyoxyalkylene triols, more particularly polyoxypropylene diols or polyoxypropylene triols.

Especially suitable are polyoxyalkylene diols or polyoxyalkylene triols having a degree of unsaturation of lower than 0.02 meq/g and having a molecular weight in the range of 1000-30 000 g/mol, and also polyoxypropylene diols and triols having a molecular weight of 400-8000 g/mol.

Likewise particularly suitable are what are known as ethylene oxide-terminated ("EO-endcapped", ethylene oxide-endcapped) polyoxypropylene polyols. The latter are specific polyoxypropylene-polyoxyethylene polyols which are obtained, for example, by subjecting pure polyoxypropylene polyols, more particularly polyoxypropylene diols and triols, after the end of the polypropoxylation reaction, to further alkoxylation with ethylene oxide and which as a result contain primary hydroxyl groups.

Styrene-acrylonitrile- or acrylonitrile-methyl methacrylate-grafted polyether polyols.

Polyester polyols, also called oligoesterols, prepared for example from dihydric to trihydric alcohols such as, for example, 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols with organic dicarboxylic acids or their anhydrides or esters such as, for example, succinic acid, glutaric acid, adipic acid, suberic acid, sebacic acid, dodecanedicarboxylic acid, maleic acid, fumaric acid, phthalic acid, isophthalic acid, terephthalic acid, and hexahydrophthalic acid or mixtures of the aforementioned acids, and also polyester polyols formed from lactones such as $\epsilon$-caprolactone, for example.

Polycarbonate polyols of the kind obtainable by reacting, for example, the abovementioned alcohols—those used to synthesize the polyester polyols—with dialkyl carbonates, diaryl carbonates or phosgene.

Polyacrylate polyols and polymethacrylate polyols.

Polyhydrocarbon polyols, also called oligohydrocarbonols, such as, for example, polyhydroxy-functional ethylene-propylene, ethylene-butylene or ethylene-propylene-diene copolymers, of the kind prepared, for example, by the company Kraton Polymers, or polyhydroxy-functional copolymers of dienes such as 1,3-butanediene or diene mixtures and vinyl monomers such as styrene, acrylonitrile or isobutylene, or polyhydroxy-functional polybutadiene polyols, such as those, for example, which are prepared by copolymerization of 1,3-butadiene and allyl alcohol.

Polyhydroxy-functional acrylonitrile/polybutadiene copolymers of the kind preparable, for example, from epoxides or amino alcohols and carboxyl-terminated acrylonitrile/polybutadiene copolymers (available commercially under the name Hycar® CTBN from Hanse Chemie).

These stated polyols preferably have an average molecular weight of 250-30 000 g/mol, more particularly of 1000-30 000 g/mol, and preferably have an average OH functionality in the range from 1.6 to 3.

Further to these stated polyols it is possible to use small amounts of low molecular mass dihydric or polyhydric alcohols such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexane-dimethanol, hydrogenated bisphenol A, dimeric fatty alcohols, 1,1,1-trimetholethane, 1,1,1-trimethylolpropane, glycerol, pentaerythritol, sugar alcohols such as xylitol, sorbitol or mannitol, sugars such as sucrose, other polyhydric alcohols, low molecular mass alkoxylation products of the aforementioned dihydric and polyhydric alcohols, and also mixtures of the aforementioned alcohols, in preparing the polyurethane prepolymer P1.

It has emerged that the liquid polyurethane prepolymer P1 is prepared at least from a polyoxyalkylene polyol, more particularly a polyalkylene diol or polyalkylene diol, preferably having a degree of unsaturation of lower than 0.02 meq/g and a molecular weight of 1000-30 000 g/mol, more particularly of 1000-8000 g/mol, and at least one polyisocyanate.

As polyisocyanates for the preparation of the polyurethane prepolymer P1 it is possible to make use of the following commercially customary polyisocyanates, for example:

1,6-hexamethylene diisocyanate (HDI), 2-methylpentamethylene 1,5-diisocyanate, 2,2,4- and 2,4,4-trimethyl-1,6-hexamethylene diisocyanate (TMDI), 1,12-dodecamethylene diisocyanate, lysine diisocyanate and lysine ester diisocyanate, cyclohexane 1,3- and 1,4-diisocyanate and any desired mixtures of these isomers, 1-isocyanato-3,3,5-trimethyl-5-isocyanatomethylcyclohexane (i.e., isophorone diisocyanate or IPDI), perhydro-2,4'- and -4,4'-diphenylmethane diisocyanate (HMDI), 1,4-diiso-cyanato-2,2,6-trimethylcyclohexane (TMCDI), 1,3- and 1,4-bis(isocyanatomethyl)cyclohexane, m- and p-xylylene diisocyanate (m- and p-XDI), m- and p-tetramethyl-1,3- and 1,4-xylylene diisocyanate (m- and p-TMXDI), bis(1-isocyanato-1-methylethyl)naphthalene, 2,4- and 2,6-tolylene diisocyanate and any desired mixtures of these isomers (TDI), 4,4'-, 2,4'-, and 2,2'-diphenylmethane diisocyanate and any desired mixtures of these isomers (MDI), 1,3- and 1,4-phenylene diisocyanate, 2,3,5,6-tetramethyl-1,4-diiso-cyanatobenzene, naphthalene 1,5-diisocyanate (NDI), 3,3'-dimethyl-4,4'-diisocyanatobiphenyl (TODI), oligomers and polymers of the aforementioned isocyanates, and also any desired mixtures of the aforementioned isocyanates. Preference is given to MDI, TDI, HDI, and IPDI.

The liquid polyurethane prepolymer P1 is used typically in a fraction of 20%-40% by weight, based on the overall hotmelt adhesive composition.

Particularly preferred hotmelt adhesive compositions are those in which the weight ratio of polyurethane prepolymer P1 to polyurethane P2 is 15-4, more particularly 10-6.

For the optimization of the mechanical properties and application properties it is of advantage if the hotmelt adhesive composition further comprises at least one filler. The filler is used preferably in an amount of 20%-50% by weight, based on the overall hotmelt adhesive composition. Suitable fillers include organic and inorganic fillers, examples being natural, ground or precipitated calcium carbonates, coated where appropriate with fatty acids, more particularly stearates, or barytes ($BaSO_4$, also called heavy spar), calcined kaolins, silicas, more particularly highly disperse silicas from pyrolysis processes, carbon blacks, more particularly industrially produced carbon blacks (referred to below as "carbon black"), PVC powders or hollow beads, and also flame-retardant fillers such as hydrates or hydroxides, more particularly aluminium hydroxide and aluminium oxide trihydrate. Preferred fillers are calcium carbonates, carbon blacks and calcined kaolins.

Additionally it is advantageous if the hotmelt adhesive composition comprises at least one catalyst, more particularly an organotin catalyst, such as dibutyltin dilaurate, for example.

It has emerged that it is particularly advantageous to use a catalyst mixture, more particularly a mixture of an organotin catalyst and a catalyst containing tertiary amino groups, such as, for example, 2,2'-dimorpholinodiethyl ether (DMDEE) or 1,4-diazabicyclo[2.2.2]octane (DABCO).

The amount of the catalyst, more particularly of the organotin catalyst is advantageously between 0.1% and 2% by weight, based on the overall hotmelt adhesive composition.

The composition where appropriate comprises further constituents of the kind typically used in accordance with the prior art. More particularly the composition comprises, if desired, one or more of the following auxiliaries and adjuvants:

plasticizers, examples being esters of organic carboxylic acids or their anhydrides, phthalates, such as dioctyl phthalate or diisodecyl phthalate, for example, adipates, such as dioctyl adipate, for example, and sebacates, polyols, such as polyoxyalkylene polyols or polyester polyols, for example, organic phosphoric and sulphonic esters or polybutenes;

solvents, examples being ketones such as acetone, methyl ethyl ketone, diisobutyl ketone, acetonylacetone, mesityl oxide, and also cyclic ketones such as methylcyclohexanone and cyclohexanone; esters such as ethyl acetate, propyl acetate or butyl acetate, formates, propionates or malonates; ethers such as ketone ethers, ester ethers and dialkyl ethers such as diisopropyl ether, diethyl ether, dibutyl ether, diethylene glycol diethyl ether and also ethylene glycol diethyl ether; aliphatic and aromatic hydrocarbons such as toluene, xylene, heptane, octane, and also various petroleum fractions such as naphtha, white spirit, petroleum ether or benzine; halogenated hydrocarbons such as methylene chloride; and also N-alkylated lactams such as N-methylpyrrolidone, N-cyclohexylpyrrolidone or N-dodecylpyrrolidone, for example;

further catalysts customary within polyurethane chemistry;

reactive diluents and crosslinkers, examples being polyisocyanates such as MDI, PMDI, TDI, HDI, 1,12-dodecamethylene diisocyanate, cyclohexane 1,3- or 1,4-diisocyanate, IPDI, perhydro-2,4'- and -4,4'-diphenylmethane diisocyanate, 1,3- and 1,4-tetramethylxylylene diisocyanate, oligomers and polymers of these polyisocyanates, more particularly isocyanurates, carbodiimides, uretonimines, biurets, allophanates, and iminooxadiazinediones of the stated polyisocyanates, adducts of polyisocyanates with short-chain polyols, and also adipic dihydrazide and other dihydrazides;

latent polyamines such as, for example, polyaldimines, polyketimines, polyenamines, polyoxazolidines, polyamines microencapsulated or adsorbed on a zeolite, and amine-metal complexes, preferably polyaldimines from the reaction of a primary aliphatic polyamine with an aldehyde, more particularly an aldehyde such as, for example, 2,2-dimethyl-3-acyloxypropanal, more particularly 2,2-dimethyl-3-lauroyloxypropanal, and also complexes formed between methylenedianiline (MDA) and sodium chloride (available as a dispersion in diethylhexyl phthalate or diisodecyl phthalate under the trade name Caytur® 21 from Crompton Chemical);

dryers, such as p-tosyl isocyanate and other reactive isocyanates, orthoformic esters, calcium oxide; vinyltrimethoxysilane or other fast-hydrolysing silanes such as organoalkoxysilanes, for example, which have a functional group positioned a to the silane group, or molecular sieves;

rheology modifiers such as, for example, thickeners, for example urea compounds, polyamide waxes, bentonites or fumed silicas;

adhesion promoters, more particularly organoalkoxysilanes such as, for example, epoxysilanes, vinylsilanes, (meth)acrylosilanes, isocyanatosilanes, carbamatosilanes, S-(alkylcarbonyl)mercaptosilanes, and aldiminosilanes, and also oligomeric forms of these silanes;

stabilizers against heat, light radiation and UV radiation;

flame retardants;

surface-active substances such as wetting agents, flow control agents, deaerating agents or defoamers, for example;

biocides such as, for example, algicides, fungicides or fungal growth inhibitors;

and also further substances typically used in isocyanate-comprising compositions.

The moisture-curing hotmelt adhesive composition described is kept in the absence of humidity. It is storage-stable; that is, it can be kept in the absence of moisture in a suitable pack or facility, such as a drum, a pouch or a cartridge, for example, for a period ranging from several months up to a year or more, without any alteration in its application properties or in its properties after curing to any service-relevant extent. Customarily the storage stability is determined via the measurement of the viscosity, the extrusion volume or the extrusion force.

The hotmelt adhesive composition reacts with crosslinking with water (chemical curing). Here, the isocyanate groups react with water, more particularly in the form of atmospheric moisture, to form urea groups. After the majority or all of the isocyanate groups have undergone reaction, the hotmelt adhesive composition thereby attains its ultimate strength.

In a further aspect the invention provides a method of adhesively bonding a first substrate S1 to a second substrate S2. This method comprises at least the steps of:

(i) heating a moisture-reactive hotmelt adhesive composition as described above to a temperature of 40-120° C., more particularly of 60-90° C.;

(ii) applying the heated moisture-reactive hotmelt adhesive composition to the surface of a first substrate S1;

(iii) joining, with contacting, the surface of the second substrate S2 to the hotmelt adhesive composition applied to the first substrate S1, within the open time;

(iv) curing the hotmelt adhesive composition by means of water.

The first substrate S1 and the second substrate S2 here may be made of the same or different material.

One variant of this method is a method which comprises at least the steps of:

(i) heating a moisture-reactive hotmelt adhesive composition as described above to a temperature of 40-120° C., more particularly of 60-90° C.;

(ii') applying the heated moisture-reactive hotmelt adhesive composition in a gap which is formed at least partly by the surface of a first substrate S1 and the surface of a second substrate S2, and thus contacting the surface of the first substrate S1 and of the second substrate S2 by means of adhesive (iv) curing the hotmelt adhesive composition by means of water.

The first substrate S1 and the second substrate S2 here may be made of the same or different material.

Preferred substrates S1 and/or S2 are more particularly glass, glass ceramic, PVC, metal, wood, coated metal or coated wood.

With particular preference one of the two substrates S1 and S2 is glass or glass ceramic and the other is PVC or coated metal or coated wood.

The open time, in other words the time which elapses between the application of the hotmelt adhesive composition and the point in time at which the hotmelt adhesive composition loses its adhesion to the substrate to be joined, is at least 40 minutes. The skinover time is as long or longer than the open time. In other words, the hotmelt adhesive composition has an open time of at least 40 minutes. The open time is preferably between 40 and 240 minutes, more particularly between 40 and 180 minutes. Most preferably the open time is between 40 and 80 minutes.

If bonding takes place within the open time, an early strength is developed, even within the interim period, that allows the hotmelt adhesive composition to transmit forces between the substrates S1 and S2.

It is important to realise that the hotmelt adhesive composition may already be in contact with atmospheric moisture immediately after application and hence that the chemical curing may set in at this point. This curing, however, prior to step (iii) of joining, or of contacting in step (ii'), has still not progressed to such an extent that a skin is formed on the surface. Customarily the chemical curing takes place for the most part only after step (iii) of joining, or after the contacting in step (ii').

During the open time the adherends can be moved, wrapped or adjusted without any negative effect on adhesion after curing of the hotmelt adhesive composition.

The result of an adhesive bonding method of this kind is an adhesively bonded article.

Articles of this kind may represent a broad range of articles according to the field of use. Preferably this article represents a glazing unit, a window or a door. This in turn may represent part of a built structure or means of transport.

The hotmelt adhesive composition is preferred for the adhesive bonding of parts of large surface area.

Preferred applications include firstly the installation of glazing units in means of transport, more particularly in buses and rail vehicles.

Preferred secondly are the production of doors and windows in which glass glazing units, preferably units of insulation glass, are bonded adhesively to the frame, which is of wood, plastic, preferably PVC, or metal, preferably coated metal, by means of the hotmelt adhesive composition.

Apart from the applications mentioned, however, the hotmelt adhesive composition may also be utilized for further applications.

EXAMPLES

TABLE 1

| Raw materials used | |
| --- | --- |
| Acclaim ® 4200N | Bayer Low monol polyoxypropylene diol, average molecular weight about 4000 g/mol, OH number 28 mg KOH/g, water content 0.01% by weight |

TABLE 1-continued

Raw materials used

| | |
|---|---|
| Voranol ® CP 4755 | Dow Chemical Ethylene oxide-terminated polyoxypropylene triol, average molecular weight about 4700 g/mol, OH number 35 mg KOH/g, water content 0.02% by weight |
| Pearlbond ® DIPP-523 ('523') | Merquinsa, Spain Linear thermoplastic polyurethane containing polycaprolactone segments melt viscosity (170° C.) (DIN 53.735) = 130 Pa·s Melt Flow Index (DIN 53.735) = 70-90 g/10 min OH number < 5 mg KOH/g |
| Pearlbond ® 503 ('503') | Merquinsa, Spain Linear thermoplastic polyurethane containing polycaprolactone segments melt viscosity (170° C.) (DIN 53.735) = 130 Pa·s Melt Flow Index (DIN 53.735) = 70-90 g/10 min OH number < 5 mg KOH/g |
| Pearlbond ® DIPP-539 ('539') | Merquinsa, Spain Linear thermoplastic polyurethane containing polycaprolactone segments melt viscosity (170° C.) (DIN 53.735) = 62 Pa·s Melt Flow Index (DIN 53.735) = 150-200 g/10 min OH number < 5 mg KOH/g |
| Acronal LR 8820 ('Acronal') | BASF High-viscosity poly-n-butyl acrylate |
| Irostic M8304 ('Irostic') | Huntsman GmbH, Germany Linear polyurethane, melt viscosity at 190° C. = 17 Pa·s; Melt Volume Rate 60-90 at 170° C./10 kg |

Preparation of a Polyurethane Prepolymer P1 Being Liquid at Room Temperature Containing Isocyanate Groups: P1-1

In the absence of moisture, in a stirred vessel, 1560 g of Acclaims 4200N, 3120 g of Voranol® CP 4755, 600 g of diisodecyl phthalate (DIDP), 720 g of 4,4'-diphenylmethane diisocyanate (having an NCO equivalent weight of 125 g/eq) were stirred at 90° C. for 4 hours until the isocyanate content of the mixture had a constant value of 2.15% by weight. The resulting product was cooled to room temperature and kept in the absence of moisture. It had a viscosity of 64 Pa·s at 20° C.

Preparation of the Hotmelt Adhesive Compositions: Ref. 1-Ref. 3 and 1-4

The hotmelt adhesive compositions were prepared in a planetary mixer which was equipped with heating jacket and vacuum pump.

The plasticizer (DIDP) was introduced as an initial charge, after which the polyurethane prepolymer P1-1, prepared as described above, the thixotropic agent (fumed silica) and also the solid polymer (the polyurethane P2, '539', 'Acronal' or 'Irostic') were added and these components were mixed under nitrogen for 5 minutes. Subsequently the filler (calcined kaolin) was added and mixed in under nitrogen for 10 minutes. The mixer was then evacuated to 100 mbar and the components mixed at a high speed until the temperature of the mixture had risen to 70° C. The hotmelt adhesive composition was monitored for fineness and, if necessary, remixed further. Then the catalyst solution (25% by weight of dibutyltin dilaurate in DIDP) was added and the components were again mixed at a high speed for 5 minutes, after which the vacuum was broken using nitrogen and the hotmelt adhesive composition was dispensed into aluminium cartridges.

Measurement Methods

The open time was measured as follows. The sealed cartridge containing the respective hotmelt adhesive composition was heated at 80° C. for 2 hours. The adhesive was then applied as a bead, via a circular nozzle applied to the end of the cartridge and with an opening diameter of 8.5 mm, to a cold glass plate at a temperature of 23° C. By periodically contacting the bead of adhesive with the tip of a polyethylene pipette, a determination was made of the point in time at which it was not possible to observe the pipette being wetted by the curing adhesive. This point in time was reported as the "open time".

The viscosity was measured on a thermostated viscometer, Physica MCR 300 (plate/plate, plate diameter 20 mm, plate distance 1 mm, shear rate $50\,s^{-1}$) at the respective temperature (50° C., 75° C., 100° C.) and reported as "$visc_{50°\,C.}$", "$visc_{75°\,C.}$", "$visc_{100°\,C.}$".

The Shore A hardness was determined in accordance with DIN 53505. The samples were subjected to measurement after curing for 1, 7 and 14 days at 23° C. and 50% relative humidity.

The through-cure rate was determined as follows.

The adhesive, stored for 2 hours in an oven at 80° C., was applied in the wedge-shaped recess in a Teflon mould and leveled off with a wooden spatula. After 24 hours at 23° C. and 50% relative humidity, the adhesive, which had now crosslinked, was carefully lifted from the Teflon mould, starting from the thin end of the wedge, up to the point (i.e. thickness) at which uncured adhesive was found on the inclined wedge recess surface. Owing to the dimensions, it is possible in this way to determine the curing layer thickness as a measure of the through-cure rate. This figure is reported in Table 2 as "$TCR_{24h}$".

The tensile strength "TS" and the breaking extension "EB" were determined in accordance with DIN 53504 (pulling speed: 200 mm/min) on films with a layer thickness of 1.1 mm which had been cured for 14 days under standard conditions (23±1° C., 50±5% relative humidity).

The adhesions were determined as follows:

For the testing of the adhesion, the substrates were cleaned with Sika® Cleaner 205. After an evaporation time of 10 minutes, the respective composition was applied in the form of a bead from a cartridge which had been heated in an oven at 80° C. for 2 hours to the respective substrate. The substrate coated with the bead was then stored for 7 days under standard conditions (23±1° C., 50±5% relative humidity), after which the adhesion was tested. For the test of the adhesion, the cured bead was insized at one end just above the surface of the substrate (adhesion face). The insized end of the bead was held by hand and then carefully and slowly pulled from the substrate, with a peeling action in the direction of the other end of the bead. If in the course of this operation the adhesion was sufficiently strong that the end of the bead threatened to tear off on pulling, a cutter was used to apply a cut perpendicularly to the bead-pulling direction, down to the bare surface of the substrate, and in this way a section of bead was detached. Cuts of this kind were repeated if necessary in the course of further pulling at intervals of 2 to 3 mm. In this way, the entire bead was pulled and/or cut from the substrate. The adhesion properties were evaluated on the basis of the cured sealant or adhesive which remains on the substrate surface after the bead has been removed (cohesive fracture), more specifically by an estimation of the cohesive component of the adhesion face, in accordance with the following scale:

1=more than 95% cohesive fracture

2=75-95% cohesive fracture

3=25-75% cohesive fracture

4=less than 25% cohesive fracture

Test results with cohesive fracture figures of less than 75%, in other words values of 3 and 4, are considered inadequate.

TABLE 2

Compositions and their properties.

|  | Ref. 1 | Ref. 2 | Ref. 3 | 1 | 2 | 3 | 4 |
|---|---|---|---|---|---|---|---|
| P1-1 (P1) | 36 | 36 | 36 | 36 | 36 | 36 | 36 |
| DIDP | 8 | 8 | 8 | 8 | 8 | 8 | 8 |
| fumed silica | 5 | 5 | 5 | 5 | 5 | 5 | 5 |
| calcined kaolin | 46 | 43 | 43 | 43 | 45 | 44 | 46 |
| DBTDL (25% in DIDP) | 2 | 2 | 2 | 2 | 1 | 1 | 1 |
| 523 (P2) |  |  |  | 6 |  | 6 | 4 |
| 503 (P2) |  |  |  |  | 5 |  |  |
| 539 |  |  | 6 |  |  |  |  |
| Acronal | 3 |  |  |  |  |  |  |
| Irostic |  | 6 |  |  |  |  |  |
| Total | 100 | 100 | 100 | 100 | 100 | 100 | 100 |
| open time [min] | 20 | 6 | 30 | 45 | 120 | 160 | 70 |
| visc$_{50°C}$ [Pa s] | 99 | 169 | 299 | 118 | 64 | 98 | 106 |
| visc$_{75°C}$ [Pa s] | 53 | 36 | 81 | 28 | 23 | 24 | 31 |
| visc$_{100°C}$ [Pa s] | 30 | 20 | 37 | 16 | 15 | 16 | 20 |
| TCR$_{24h}$ [mm] | 4.5 | 3.7 | 3 | 3.9 | 3.5 | 3.3 | 3.0 |
| Shore A$_{1d}$ | 27 | 58 | 42 | 44 | 35 | 40 | 39 |
| Shore A$_{7d}$ | 52 | 64 | 58 | 56 | 48 | 48 | 50 |
| Shore A$_{14d}$ | 53 | 70 | 61 | 57 | 52 | 55 | 57 |
| TS [MPa] | 3.96 | 3.9 | 3.5 | 3.4 | 3.98 | 3.2 | 3.3 |
| EB [%] | 556 | 455 | 335 | 330 | 400 | 390 | 330 |
| modulus of elasticity [MPa] | 3.17 | 8.6 | 5 | 6.4 | 3.64 | 4.7 | 5.5 |
| adhesion |  |  |  |  |  |  |  |
| to glass | 1 | 1 | 1 | 1 | 1 | 1 | 1 |
| to 2C-PUR | 1 | 1 | 1 | 1 | 1 | 1 | 1 |

The invention claimed is:

1. Moisture-reactive hotmelt adhesive composition comprising
   a) at least one polyurethane prepolymer P1 containing isocyanate groups and being liquid at room temperature, and
   b) at least one linear polyurethane P2 being solid at room temperature which comprises polycaprolactone segments, contains hydroxyl groups and has a melt viscosity of 100-300 Pa·s at 170° C.
   wherein
      the prepolymer P1 is obtained through a reaction of at least one polyisocyanate with at least one polyol, the polyol being a polyoxyalkylene diol or a polyoxyalkylene triol having a degree of unsaturation of lower than 0.02 meq/g and a molecular weight of 1,000 to 30,000 g/mol.

2. Moisture-reactive hotmelt adhesive composition according to claim 1, wherein the linear polyurethane P2 being solid at room temperature comprising polycaprolactone segments is prepared from at least one polycaprolactone diol and at least one diisocyanate having a molecular weight of below 1000 g/mol.

3. Moisture-reactive hotmelt adhesive composition according to claim 2, wherein the polyurethane P2 being solid at room temperature comprising polycaprolactone segments is a polyurethane chain extended by alkylene diol and formed from polycaprolactone diol and a diisocyanate having a molecular weight of below 1000 g/mol.

4. Moisture-reactive hotmelt adhesive composition according to claim 1, wherein the linear polyurethane P2 being solid at room temperature comprising polycaprolactone segments has a melt flow index of 30-100 g/10 minutes.

5. Moisture-reactive hotmelt adhesive composition according to claim 1, wherein the linear polyurethane P2 being solid at room temperature comprising polycaprolactone segments has a melt viscosity of 100-150 Pa·s at 170° C.

6. Moisture-reactive hotmelt adhesive composition according to claim 1, wherein the linear polyurethane P2 being solid at room temperature comprising polycaprolactone segments has an OH number of less than 5 mg KOH/g.

7. Moisture-reactive hotmelt adhesive composition according to claim 1, wherein the fraction of the polyurethane P2 being solid at room temperature comprising polycaprolactone segments is 1.5%-10% by weight, based on the weight of the moisture-reactive hotmelt adhesive composition.

8. Moisture-reactive hotmelt adhesive composition according to claim 1, wherein the weight ratio of polyurethane prepolymer P1 being liquid at room temperature to solid polyurethane P2 is 15-4.

9. Moisture-reactive hotmelt adhesive composition according to claim 1, the composition further comprising at least one filler.

10. Moisture-reactive hotmelt adhesive composition according to claim 1, wherein the composition has an open time of 40 to 240 minutes.

11. Moisture-reactive hotmelt adhesive composition according to claim 1, the composition further comprising at least one organotin catalyst.

12. Method of adhesively bonding a first substrate S1 and a second substrate S2, comprising the steps of
   (i) heating a moisture-reactive hotmelt adhesive composition according to claim 1 to a temperature of 40-120° C.;
   (ii) applying the heated moisture-reactive hotmelt adhesive composition to the surface of a first substrate S1;
   (iii) joining, with contacting, the surface of the second substrate S2 to the hotmelt adhesive composition applied to the first substrate S1, within the open time; and
   (iv) curing the hotmelt adhesive composition by means of water;
the first substrate S1 and the second substrate S2 being made from the same or different material.

13. Method according to claim 12, wherein the first substrate S1 and/or the second substrate S2 is made of glass, glass ceramic, PVC, metal, wood, coated metal or coated wood.

14. Method according to claim 12, wherein one of the two substrates S1 and S2 is glass or glass ceramic and the other is PVC or coated metal or coated wood.

15. Method according to claim 12, wherein the open time is between 40 and 240 minutes.

16. Adhesively bonded article adhesively bonded according to claim 12.

17. Adhesively bonded article according to claim 16, wherein the article is a glazing unit, a window or a door.

18. Adhesively bonded article according to claim 16, wherein the article is a built structure or a means of transport.

19. Method of adhesively bonding a first substrate S1 and a second substrate S2, comprising the steps of
 (i) heating a moisture-reactive hotmelt adhesive composition according to claim 1 to a temperature of 40-120° C.;
 (ii') applying the heated moisture-reactive hotmelt adhesive composition in a gap which is formed at least partly by the surface of a first substrate S1 and the surface of a second substrate S2, and thus contacting the surface of the first substrate S1 and of the second substrate S2 by means of adhesive; and
 (iv) curing the hotmelt adhesive composition by means of water;

the first substrate S1 and the second substrate S2 being made from the same or different material.

* * * * *

UNITED STATES PATENT AND TRADEMARK OFFICE
CERTIFICATE OF CORRECTION

| | | |
|---|---|---|
| PATENT NO. | : 8,357,453 B2 | Page 1 of 1 |
| APPLICATION NO. | : 12/226351 | |
| DATED | : January 22, 2013 | |
| INVENTOR(S) | : Onuoha | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 863 days.

Signed and Sealed this
Eleventh Day of November, 2014

Michelle K. Lee
*Deputy Director of the United States Patent and Trademark Office*